(12) United States Patent
Barker et al.

(10) Patent No.: US 8,702,064 B2
(45) Date of Patent: Apr. 22, 2014

(54) CABLE INSTALLATION USING OPTICAL DETECTION

(75) Inventors: Philip Alfred Barker, Ipswich (GB); David John Taylor Heatley, Felixstowe (GB); Ian Neild, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 549 days.

(21) Appl. No.: 12/810,737

(22) PCT Filed: Dec. 23, 2008

(86) PCT No.: PCT/GB2008/004281
§ 371 (c)(1), (2), (4) Date: Dec. 21, 2010

(87) PCT Pub. No.: WO2009/083721
PCT Pub. Date: Jul. 9, 2009

(65) Prior Publication Data
US 2011/0084244 A1    Apr. 14, 2011

(30) Foreign Application Priority Data
Dec. 28, 2007 (EP) .................................. 07255077

(51) Int. Cl.
*B65H 59/00* (2006.01)
*B63B 35/03* (2006.01)

(52) U.S. Cl.
USPC ................................ 254/134.4; 254/134.3 R (58) Field of Classification Search
USPC .................. 254/134.3 FT, 134.3 R, 134.4; 250/231.1, 231.11; 385/12, 13; 340/524, 686.1, 118, 815, 855; 356/614, 615, 621, 638; 138/104, 98
See application file for complete search history.

(56) References Cited

U.S. PATENT DOCUMENTS 3,814,935 A * 6/1974 Kissel .................... 250/231.14
4,357,918 A   11/1982 Asano (Continued)

FOREIGN PATENT DOCUMENTS

DE    4202147    7/1993
DE   10338950    6/2005

(Continued)

OTHER PUBLICATIONS

International Search Report for International Application No. PCT/GB2007/003811 mailed Jan. 11, 2008.

(Continued)

*Primary Examiner* — Lee D Wilson
*Assistant Examiner* — Nirvana Deonauth
(74) *Attorney, Agent, or Firm* — Patterson Thuente Pedersen, P.A.

(57) ABSTRACT

A device for use with a conduit having a first conduit end and a conduit second end, into which conduit a cable can be installed using a flow of air into the first conduit end, the device being suitable for confirming that the flow of air is exiting the second conduit end, the device including a housing, means to enable connection of the device to the second conduit end, a light source, a detector arranged to detect a presence or absence of a light signal, and a light shield, wherein in use, the flow of air entering the device causes the light shield and at least one of the light source or the detector, to move to and to stay at a position relative to the other, permitting the detector to detect detections including one or more of a presence or absence of the light signal, an intensity level of the light signal, a change in the presence or absence of the light signal, or a change in the intensity level of the light signal.

25 Claims, 4 Drawing Sheets

(56) References Cited

U.S. PATENT DOCUMENTS

| | | |
|---|---|---|
| 4,471,651 A | 9/1984 | Dimeff et al. |
| 4,856,937 A | 8/1989 | Grocott et al. |
| 4,880,484 A | 11/1989 | Obermeier et al. |
| 4,948,219 A | 8/1990 | Seino et al. |
| 5,002,090 A | 3/1991 | Ichikawa et al. |
| 5,121,644 A | 6/1992 | Grey et al. |
| 5,143,353 A | 9/1992 | Sano et al. |
| 5,199,689 A | 4/1993 | Proud et al. |
| 5,211,377 A | 5/1993 | Griffioen et al. |
| 5,248,128 A | 9/1993 | Warren et al. |
| 5,467,968 A | 11/1995 | Proud et al. |
| 5,699,996 A | 12/1997 | Boyle et al. |
| 5,813,658 A | 9/1998 | Kaminski et al. |
| 5,835,657 A | 11/1998 | Suarez et al. |
| 5,953,475 A | 9/1999 | Beier et al. |
| 6,129,341 A | 10/2000 | Griffioen et al. |
| 6,311,953 B1 | 11/2001 | Lang et al. |
| 6,328,283 B1 | 12/2001 | Reeve et al. |
| 6,364,290 B1 | 4/2002 | Barker |
| 6,418,264 B1 | 7/2002 | Hough et al. |
| 6,480,635 B1 | 11/2002 | Russell et al. |
| 6,631,884 B2 | 10/2003 | Griffioen et al. |
| 6,694,085 B2 | 2/2004 | Bergqvist et al. |
| 6,937,033 B2 | 8/2005 | Boronkay et al. |
| 6,992,580 B2 | 1/2006 | Kotzin et al. |
| 7,021,426 B2 | 4/2006 | Griffioen et al. |
| 7,064,559 B2 | 6/2006 | Bissonnette et al. |
| 7,209,028 B2 | 4/2007 | Boronkay et al. |
| 7,225,533 B2 | 6/2007 | Sylvia et al. |
| 7,408,474 B2 | 8/2008 | Frazier et al. |
| 7,562,861 B2 | 7/2009 | Fee et al. |
| 7,942,382 B2 | 5/2011 | Lecoq et al. |
| 8,117,923 B2 | 2/2012 | Sasaki |
| 8,275,227 B2 | 9/2012 | Thurlow et al. |
| 8,276,883 B2 * | 10/2012 | Heatley et al. ......... 254/134.3 R |
| 8,350,581 B1 | 1/2013 | Brady et al. |
| 2002/0034365 A1 | 3/2002 | Vogelsang |
| 2002/0121440 A1 | 9/2002 | Morris |
| 2002/0158239 A1 | 10/2002 | Griffioen et al. |
| 2003/0001592 A1 | 1/2003 | Boronkay et al. |
| 2003/0006669 A1 | 1/2003 | Pei et al. |
| 2003/0222663 A1 | 12/2003 | Acosta-Geraldino et al. |
| 2004/0135588 A1 | 7/2004 | Bissonnette et al. |
| 2005/0073327 A1 | 4/2005 | Walcott |
| 2006/0203086 A1 | 9/2006 | Pavlakovic |
| 2006/0219992 A1 | 10/2006 | Fee et al. |
| 2006/0275008 A1 | 12/2006 | Xin |
| 2007/0047894 A1 | 3/2007 | Holmberg et al. |
| 2007/0104447 A1 | 5/2007 | Allen |
| 2008/0011990 A1 | 1/2008 | Kostet et al. |
| 2008/0013893 A1 | 1/2008 | Zheng et al. |
| 2008/0013907 A1 | 1/2008 | Zumovitch et al. |
| 2008/0050083 A1 | 2/2008 | Frazier et al. |
| 2008/0267714 A1 | 10/2008 | Lecoq et al. |
| 2009/0010606 A1 | 1/2009 | Thurlow et al. |
| 2009/0026429 A1 | 1/2009 | Barker et al. |
| 2009/0065547 A1 * | 3/2009 | Heatley et al. ............... 226/97.1 |
| 2009/0065753 A1 | 3/2009 | Gonen et al. |
| 2009/0166597 A1 | 7/2009 | Weaver et al. |
| 2010/0148138 A1 | 6/2010 | Baker et al. |
| 2010/0155681 A1 | 6/2010 | Taylor et al. |
| 2011/0006786 A1 | 1/2011 | Heatley et al. |
| 2011/0062973 A1 | 3/2011 | Paterson |
| 2011/0079027 A1 | 4/2011 | Ghan et al. |
| 2011/0135267 A1 | 6/2011 | Barker et al. |
| 2011/0178713 A1 | 7/2011 | Barker |
| 2012/0023715 A1 | 2/2012 | Barker et al. |
| 2012/0029846 A1 | 2/2012 | Heatley et al. |
| 2013/0011110 A1 | 1/2013 | Kerry et al. |

FOREIGN PATENT DOCUMENTS

| | | |
|---|---|---|
| EP | 108590 | 5/1984 |
| EP | 253636 | 1/1988 |
| EP | 0292037 | 11/1988 |
| EP | 0294243 | 12/1988 |
| EP | 0 319 194 A1 | 6/1989 |
| EP | 0319194 | 6/1989 |
| EP | 1273902 | 1/2003 |
| EP | 1333303 | 8/2003 |
| EP | 1593994 | 11/2005 |
| EP | 1022569 | 7/2007 |
| EP | 1 832 908 A1 | 9/2007 |
| EP | 1832903 | 9/2007 |
| EP | 1843181 | 10/2007 |
| FR | 2737053 | 1/1997 |
| FR | 2872299 | 12/2005 |
| GB | 2073440 | 10/1981 |
| GB | 2219662 | 12/1989 |
| GB | 2316496 | 2/1998 |
| GB | 2388966 | 11/2003 |
| JP | 5-328559 | 12/1993 |
| JP | 08163737 | 6/1996 |
| JP | 408178722 | 7/1996 |
| JP | 2000217216 | 8/2000 |
| JP | 4240806 | 3/2009 |
| SU | 1000750 | 2/1983 |
| WO | WO 88/00713 | 1/1988 |
| WO | WO 91/03756 | 3/1991 |
| WO | WO95/23988 | 9/1995 |
| WO | WO98/12588 | 3/1998 |
| WO | WO 98/12588 | 3/1998 |
| WO | WO99/12066 | 3/1999 |
| WO | WO 2006/103419 A1 | 10/2006 |
| WO | WO2006/103424 | 10/2006 |
| WO | WO2007/101975 | 9/2007 |
| WO | WO2007104910 | 9/2007 |
| WO | WO2007104913 | 9/2007 |
| WO | WO2007/113544 | 10/2007 |
| WO | WO2007/113549 | 10/2007 |
| WO | WO2007113519 | 10/2007 |
| WO | WO2007113549 | 10/2007 |
| WO | WO2008/119976 | 10/2008 |
| WO | WO2009/083722 | 7/2009 |
| WO | WO2009083715 | 7/2009 |
| WO | WO2009083721 | 7/2009 |
| WO | WO2009/131895 | 10/2009 |
| WO | WO2010004288 | 1/2010 |
| WO | WO2010034970 | 4/2010 |

OTHER PUBLICATIONS

International Search Report for International Application No. PCT/GB2010/000487dated Jul. 15, 2010.

International Search Report for International Application No. PCT/GB2008/004277 dated May 28, 2009.

International Search Report for International Application No. PCT/GB2009/002222 dated Feb. 4, 2010.

International Search Report for International Application No. PCT/GB2010/000635 dated May 6, 2011.

Application and File History for U.S. Appl. No. 12/445,844, filed Apr. 16, 2009, inventors Taylor et al.

Application and File History for U.S. Appl. No. 12/810,731, filed Sep. 21, 2010, inventors Heatley et al.

Application and File History for U.S. Appl. No. 13/120,124, filed Mar. 21, 2011, inventor Barker.

Application and File History for U.S. Appl. No. 13/260,105, filed Sep. 23, 2011, inventors Barker et al.

Application and File History for U.S. Appl. No. 13/257,440, filed Sep. 19, 2011, inventors Heatley et al.

IEEE Guide for the Design and Installation of Cable Systems in Substations. Apr. 2008. 132 pages.

Draft Recommended Practices for Cable Installation in Generating Stations and Industrial Facilities, Jan. 2010. 94 pages.

International Search Report and Written Opinion for International Application No. PCT/GB2011/000432 dated Jun. 29, 2011.

International Search Report for International Application No. PCT/GB2007/000455 mailed Mar. 28, 2007.

International Search Report for International Application No. PCT/GB2007/001216 mailed Jul. 19, 2007.

(56) References Cited

OTHER PUBLICATIONS

FIST-GC02-F, Flat FIST generic closure organizer, Tyco Electronics Raychem, Belgium, as available on Sep. 26, 2012, at http://www.te.com/content/dam/te/global/english/industries/telecom-emea/products/documents/fiber-closures/TC-1032-DS-5-09-11.pdf.

Application and File History for U.S. Appl. No. 13/637,613, filed Sep. 26, 2012, inventors Kerry et al.
Application and File History for U.S. Appl. No. 12/281,384, filed Sep. 2, 2008, inventors Thurlow et al.
Application and File History for U.S. Appl. No. 12/295,750, filed Oct. 2, 2008, inventors Baker et al.

* cited by examiner

CABLE INSTALLATION USING OPTICAL DETECTION

PRIORITY CLAIM

The present application is a National Phase entry of PCT Application No. PCT/GB2008/004281, filed Dec. 23, 2008, which claims priority from European Patent Application Number 07255077.5, filed Dec. 28, 2007, the disclosures of which are hereby incorporated by reference herein in their entireties.

TECHNICAL FIELD

The invention relates to the installation of cables, such as optical fiber units, wires, electrical cables or the like. More specifically, but not exclusively, the invention relates to the blowing of fiber unit cables through pre-laid conduits.

BACKGROUND

Optical fibers are widely used within telecommunication systems for high-speed information transfer, particularly in the core or backbone network. With the advent of fiber to the premises (FTTP), the conduits will further extend to and into commercial and residential premises. Indeed it is a fundamental part of the push to FTTP in e.g. the UK, that substantially all the network comprises optical fiber, extending from the core network to as many end customers, both commercial and residential, as possible. This involves the installation of millions of kilometers of optical fiber across the network, especially at the local access level which had previously been served by copper. To achieve widespread take-up, the optical fiber installation process needs to be speedy, cost- and effort-efficient.

An optical fiber unit, which could comprise a single optical fiber, or a bound bundle of typically 2 to 24 optical fibers, can be installed using what is known as the "blown fiber" method, described in EP 108590. In this method, a fiber unit is propagated along a hollow tube pre-laid along the desired route, where compressed air is fed, or "blown" into the mouth of the tube. The viscosity of the flow of air travelling along inside the tube, together with the friction on the outer surface of the fiber unit, helps to carry the fiber unit along the length of the tube.

The tubes or conduits typically are made of plastic, each with a typical inner diameter of 2.5 to 6 mm or more, and are usually provided in a bound bundle comprising up to 24 or more tubes, which are held together within a protective outer sheath. The tubes usually comprise a continuous span between convenient access points such as surface boxes, inspection chambers down man holes, or near telephone poles. Each fiber conduit tube can receive at least one fiber unit comprising one or more individual optical fibers. Large numbers of tube conduits—and bundles of conduits—are pre-installed across the access network and the distribution network between the local exchanges and the customer premises, typically to locations which may require a future fiber connection.

When it is decided to populate these pre-installed tubes, the fiber cable or unit is installed in each tubular span by blowing it down the conduit from one end; alternatively the unit could be blown down a concatenation of spans in a single step if circumstances permit. This is repeated for each span, or concatenation of spans, until a continuous fiber path has been laid between the end points of the whole route.

A tubular path can be described between two access points, which may be hundreds of meters apart, by a single length of conduit tube. The conduit path may alternatively comprise a number of lengths of physically separate conduit tubes which are connected together, e.g. in series. Either way, it is crucial to choose the correct conduit path during installation, so that the fiber unit emerges at the desired destination end. During installation however, the operator at one of the installation points would be presented with a large and potentially confusing number of conduit tube openings, each representing a path leading to a destination. The tube openings are usually mapped to their destinations, e.g. by color-coding. If however the tube openings are wrongly mapped, or the records otherwise inaccurate, mistakes can result in attempts to identify the correct conduit path and the correct tube opening leading to the desired destination. This is especially so if the working conditions are poor, e.g. in adverse weather up a telephone pole or down a manhole or in poor lighting.

Where the path comprises a number of tube lengths connectorized together, yet another problem may lie in broken connections between lengths of conduit tubes within the network, so that the fiber unit may get lost within the system during installation and never emerge at the destination. Yet another issue may be the possibility that the fiber unit, during installation, could be impeded by an imperfect connection or a tight bend or some other source of friction in the conduit, and again never emerge at the destination.

For any of these or other reasons, the fiber unit may, during installation, emerge in the wrong place, or in an extreme case, not at all. Add to that some uncertainty about the exact length of the conduit route down which the fiber unit is being installed, so that the operator may not even know in a timely manner when something has gone wrong.

The current response to this problem is to use two operators during installation, one at each end of the installation conduit path. The second operator at the destination end of the tubular path is required because the destination or remote end is often some distance away—up to a kilometer or more—from the head end. The operator at the head end is therefore unable to know the status of the remote end during an installation without a second operator located there reporting the status back to the head end.

During a typical installation session, the first operator situated at the head end of the conduit fits a protective slug or bead on the tip of the fiber unit, then feeds this and compressed air into the mouth of the conduit with fiber installation apparatus—known in the art as a "blowing head" which is described in general in WO88/00713. Meanwhile the second operator locates himself at the desired end point of the fiber installation. The process commences by directing compressed air into the mouth of the head end conduit. If the air is directed into the correct conduit so that the tubular path leads to the desired destination, the remote end operator can eventually sense the arrival of the air with an airflow meter temporarily connected to the end of the conduit, or more simply by feeling the airflow exiting the conduit against his hand if the airflow is sufficiently high. He then communicates this to the head end operator by radio or other means, to confirm to the head end operator that the air is applied to the correct conduit. The head end operator upon receiving the news, then blows the fiber unit into the conduit through to the remote end, whereupon the remote end operator advises his colleague on its arrival. The head end operator then turns off the air supply and the blowing head, and the installation process is complete.

This process is labor-intensive as two operators must work on a single installation. This is in turn drives up the overall cost of optical fiber installation, a problem now especially significant in the FTTP context with the considerable installation volumes involved.

Various methods requiring only a single operator installation of blown fiber have been developed, to obtain a significant saving in manpower and cost requirements. In the simplest method, the length of the conduit route is known, allowing the operator to know that the fiber has (probably) arrived at the remote end when the required length of fiber unit has been played out. This relies on the map record of conduit route being up to date and accurate, and presumes a completely smooth and obstruction-free conduit route. Neither of these can be guaranteed in practice.

Another known practice is to install at the remote end of the conduit a barrier of porous material such as an "airstone" which is constructed of a porous material which allows air through but which will stop further progress of the fiber unit. The airstone is temporarily placed at the mouth of the destination remote end of the tube conduit. When the fiber ceases to travel down the tube, this is an indication that the far end of the fiber may have reached the destination end and has been retained by the airstone barrier. However, lack of further progress is ambiguous as to whether the fiber unit has indeed reached the porous airstone at the destination end, or if instead the fiber unit is caught on an obstruction at some intermediate point along the length of the conduit.

These, together with other methods like those described in WO9103756 or WO/9812588, also describe how fiber arrival can be detected by the single operator at the head end of the installation; the initial step of detecting that the compressed air fed into the head tube end is not addressed in the above techniques.

One method, developed by the applicants of the present case and described in WO2006/103419 does describe a device which permits the detection of the arrival of both air as well as the remote end of the fiber unit at the opening of the remote tube end. The device uses a low-mass wind vane which rotates in the presence of airflow, and which rotation is stopped when the fiber end arrives and gets "caught" in the blades of the wind vane. The change in status of the wind vane can be captured as indicia of air or fiber arrival.

SUMMARY

In general, embodiments provide methods and devices for aspects relating to the installation of cables such as optical fiber units into conduit tubes using, e.g. the blown fiber method, so that a single operator can operate substantially on his own at one end, to determine if compressed air and/or the fiber unit fed into a conduit has reached its intended destination. Embodiments can be used where the operator has to choose between one of a number of conduits, or where there is a single conduit but where it is desirable to unambiguously confirm that the air and/or the fiber unit will reach or reaches the intended destination. In view of the possible volumes that may be deployed in FTTP initiatives, embodiments also address the need for cost-efficiency in being relatively cheap to manufacture and simple to operate.

An embodiment provides a device for use with a conduit having a first conduit end and a conduit second end, into which conduit a cable can be installed using a flow of air into the first conduit end, the devices, being suitable for confirming that the flow of air is exiting the second conduit end, the device comprising a housing, means to enable connection of the device to the second conduit end, a light source, a detector arranged to detect a presence or absence of a light signal, and a light shield, wherein in use, the flow of air entering the device causes the light shield and at least one of the light source or the detector, to move to and to stay at a position relative to the other, permitting the detector to detect detections comprising one or more of a presence or absence of the light signal, an intensity level of the light signal, a change in the presence or absence of the light signal, or a change in the intensity level of the light signal.

In an embodiment, air fed through from the head end flows through the conduit, and upon exiting the remote end of the conduit, enters the device housing. An increase in the air pressure within the substantially air-tight housing causes the light shield in the form of, e.g. a piston to move away from blocking the light beam emanating from the light source, at which position the light shield stays. The light beam is detected by the optical detector, and in an embodiment, this detection is signaled back to the operator at the head end, providing a confirmation that air is flowing out of the conduit at the far end. A number of types of detections are possible: the detector can be configured to detect the presence or absence of the light signal, or else it can be arranged to detect certain levels of intensity from the light signal or beam.

In further embodiments, the light shield piston moves specifically between two positions, wherein the change of positions creates a change in the light signal detected by the detector. In an embodiment, means such as a magnetic and compression spring arrangement is used to urge the light shield to move to, and to stay at, one or the other of the positions. Air vents are opened up while the piston is in a certain position to allow the air exiting the remote end of the conduit to flow out of the device housing.

Embodiments can be used to detect air arrival alone, without the need to subsequently use the same device to detect cable arrival, although there are of course advantages in using the same one device for both purposes.

In another embodiment, there is provided a device for use with a conduit having a first conduit end and a conduit second end, into which conduit a cable can be installed using a flow of air into the first conduit end, the device being suitable for confirming that the cable is exiting the second conduit end, the device comprising a housing, means to enable connection of the device to the second conduit end, a light source, and a detector arranged to detect a light signal, wherein in use, the cable entering the housing of the device interferes with the detection by the detector of the light signal from the light source.

Embodiments can confirm that the fiber unit cable fed into the conduit at the head end has reached the remote end of the conduit. This is performed by detecting an interference of the detector's detection of the light beam or signal from the light source. In embodiments, the light beam emanates transversely through the tubular housing, which is disturbed by the entry of the cable and a bead travelling along the longitudinal axis of the housing.

No light shield piston is required for the working of this embodiment. It is possible for this method to detect cable arrival with an air arrival detection other than the method claimed, although as the devices for air- and fiber arrival are virtually identical, there is a strong obvious synergy and advantage in deploying both methods, one after the other, using the same device.

Accordingly, in an embodiment, a device is configured for the detection of both air and fiber, unit cable at the remote end of the conduit, where a first light signal indicative of air arrival is detected, and then a subsequent detection comprising an interruption or interference of the light signal is detected which indicates fiber arrival.

In embodiments the intensity of the light signal leaving the light source may be steady or modulated with a known signal. The further benefit of the latter is to deliver a more distinctive signal to detector when the light path is uninterrupted. In some practical situations where stray light from outside enters the sensor enclosure through for example the conduit if the external light is particularly strong and the conduit is partially transparent, the detector can more reliably distinguish a detected signal that contains a known intensity modulation, compared with a signal that has a substantially steady intensity.

In further embodiments, there are provided systems for use with a conduit having a first conduit end and a conduit second end, into which conduit a cable can be installed using a flow of air into the first conduit end, for confirming that the flow of air is exiting the second conduit end, comprising any one of the devices as claimed, wherein apparatus at the first conduit end is configured to receive and to automatically respond to the transmitted status signal.

In systems including the use of the devices for air-only, cable-only, or air-and-cable arrival detection, the apparatus at the head end which feeds the air and/or cable into the conduit is configured to receive a status signal indicating the respective arrivals at the remote end. In a further embodiment, the head end apparatus is arranged to be automatically turned off upon receipt of the relevant signal.

In further embodiments, there are provided methods corresponding to the claimed devices and systems.

BRIEF DESCRIPTION OF THE DRAWINGS

Embodiments will now be described, by way of example only, with reference to the accompanying drawings, in which.

DETAILED DESCRIPTION

Figure 1A:
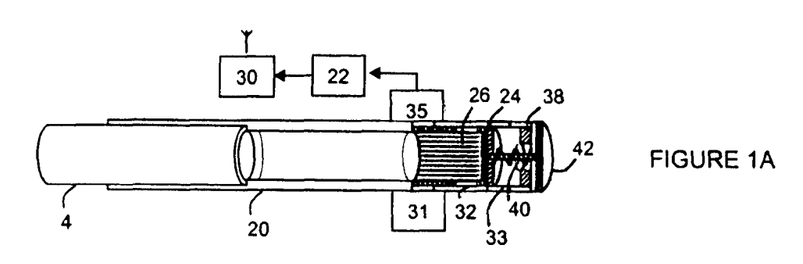
FIGS. 1A and 1B depict a device of the invention in use during airflow detection.
Figure 1B:
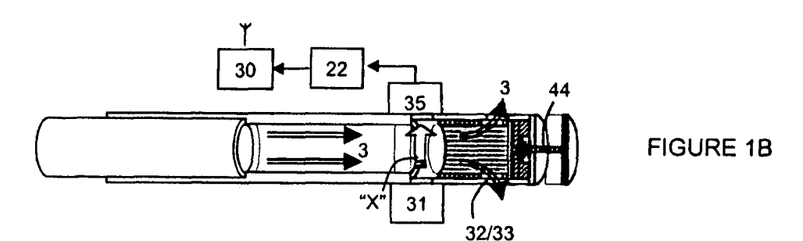

FIGS. 1A and 1B depict a first embodiment. It comprises a substantially cylindrical or tubular housing (20) which has one open end and one closed end. The open end is configured to connect with the mouth of the optical fiber tube at the remote end of the installation, e.g. in a friction fit. The housing is fabricated from a non-metallic material, such as an injection-molded plastic, which is relatively simple and cheap to manufacture.

An optical transmitter (31) and an optical receiver (35) are positioned substantially transversely opposite to each other on the housing of the sensor device, in a way so that a light beam or signal from the optical transmitter can be received by the photo-detector or receiver. A piston (26) is substantially co-axially located within the housing, where the piston is also generally tubular with one open end and one closed end. The open end of the piston faces the same direction as the open end of the housing. The piston is configured to slide along its longitudinal axis within the housing, and is constructed from e.g. an injection-molded plastic which is impervious to light, i.e. it is opaque, so that when the piston is a "rest" position within the housing, it acts as a light shield preventing the optical receiver from receiving any light from the optical transmitter.

The housing (20) and the piston (26) each include a set of air vents. The air vents of the piston (32) align with the air vents of the housing (33) when the piston is in a specific position within the housing.

In the space between the closed end of the piston and the closed end of the housing is an arrangement to hold the piston in one of two positions: the first "rest" position mentioned above, where the opaque piston lies between the optical transmitter and receiver as shown in FIG. 1A and the second "activated" position being where the piston is located nearer to the closed housing end so as to permit light from the optical transmitter to reach the optical receiver as shown in FIG. 1B. The piston is configured to slide between these two positions within the housing. The arrangement comprises a spring (40) extending from the closed end of the housing, which holds the piston in the first rest position. The second activated position is obtained by the cooperation of a metal disc (24) and a magnet (38).

In the embodiment shown, the metal disc is disposed on the closed end of the piston and the magnet on the closed end of the housing although of course the locations of these two components may be reversed. In certain embodiments, the airflow may be strong enough to retain the piston in the second activated position during use, to enable to airflow (3) to exit the housing (20). However, there may be other cases where even if the piston is made partially or even fully of metal, the metal disc may be required to ensure that the attraction of the piston assembly to the magnet is sufficiently strong. As the purpose of this assembly is to hold the piston substantially in the second activated position, it would be possible to use any suitable alternative that would achieve this end, e.g. a spring-loaded latch actuated by the travel of the piston. The skilled person would realize that it is not vital to keep the piston unmoveably in the activated position, as long as the airflow (3) can exit the device housing sufficiently for the blown fiber process to be carried out.

A plunger rod (44) connected to the closed end of the piston is pushed outwardly of the device when the piston is in the activated position, and a button (42) located at the end of the rod allows for the piston to be re-set to the rest position by the operator pressing the same to disengage the magnet and the metal disc sufficiently for the spring to urge the piston back in the first, resting position.

The use of the device to sense a flow of air (3) from the mouth of the conduit at the remote or far end of a blown fiber installation will now be described. At the start of the installation operation, the operator travels to the remote or destination end of the installation, and connects the above device to the mouth of the conduit from which it is hoped that the compressed air fed from the head end, will emerge. The housing should fit snugly to the conduit end to ensure that minimum air leakage occurs at the junction between the conduit and the device housing. The device is powered on, and set (or reset using the button (42)) so that it is in the first rest position, so that the air vents (32/33) are out of alignment, as shown in FIG. 1A, thus creating a substantially air-tight cavity within the housing. In this position, the opaque piston (26) is in a position where light from the optical transmitter (31) is prevented from reaching the optical receiver (35).

The operator returns to the head end of the installation and selects a conduit which hopefully represents the start of the conduit path which terminates at the conduit end on which the device had been placed. He then starts the installation process using the apparatus shown in FIG. 5, i.e. a compressor and a blowing head, to direct compressed air and the fiber unit into the conduit.

At the start of the blown fiber installation, the air pressure in and along the conduit is at a steady state level and airflow is zero. If the air is directed into the correct conduit opening, air eventually flows through to the remote end of the conduit to which the sensor device is coupled, and into the housing (20) of the device. Because the two sets of air vents (32 and 33) are out of alignment, the housing is substantially airtight. The increase in air pressure (e.g. up to 10 bar) within the housing caused by the airflow, gradually exceeds the pushing force of the spring (40) and causes the piston to slide towards the second, activated position. During this, the proximity of the metal disc (24) to the magnet (38) located opposite ends to each other increases. When the magnetic attraction between these two components eventually exceeds the force of air pressure within the main section of the housing and the opposing force of the spring, the piston snaps to take the second activated position shown in FIG. 1B at which point the two components are magnetically coupled together.

In this position, the light beam emanated by the light source (31) reaches the receiver (35) on the other side of the enclosure as depicted by arrow "X." The change in the light, in terms of the presence or absence of the light, and/or a change in the intensity or level, is detected and amplified (22) where necessary. A status signal can then be generated which is transmitted to the operator at the head end via the radio channel (30), who then has an unambiguous indication that he has chosen the correct conduit opening at the head end to feed air into, and moreover that the conduit path to the remote end is not broken and is free from obstructions.

In the activated position, the two sets of air vents (32 and 33) are in alignment so that the airflow (3) into the housing exhausts to the atmosphere as depicted by the arrows in FIG. 1B, resulting in a reduction of the air pressure within the housing. The force opposing that of the spring is now reduced and the force of the airflow through the housing is typically insufficient in itself to hold the piston in that location, but the magnet arrangement helps holds the piston in the activated position. At this stage, the steady airflow through the conduit essential to the blown fiber installation procedure, is attained.

Of course, if the operator did not feed the air down the correct conduit, none of the above will occur. In such a case, the operator will realize, from not receiving any signal from the remote end after a suitable time period, that something is amiss. He can then take appropriate steps, e.g. selecting another conduit end to connect to the air compressor. He will at least be aware that the fiber unit should not be installed into the first-chosen tube.

The use of the device to further sense the arrival of a fiber unit fed into the mouth of the conduit at the remote or far end of a blown fiber installation will now be described.

First, a supply of fiber unit (2) is prepared by crimping or otherwise attaching a slug or a bead (6) to the tip of one end, which protects the fragile glass fiber from damage. The bead typically has a rounded end which eases the fiber unit's progress through the conduit path. It is often made from brass which is suitable in an embodiment as it does not rust. After the operator at the head end receives confirmation by RF or by, e.g. a short message service text message, that air is flowing from the desired destination conduit, a fiber unit (2) is fed into the same conduit (4) into which the compressed air is being fed.

Figure 2A:
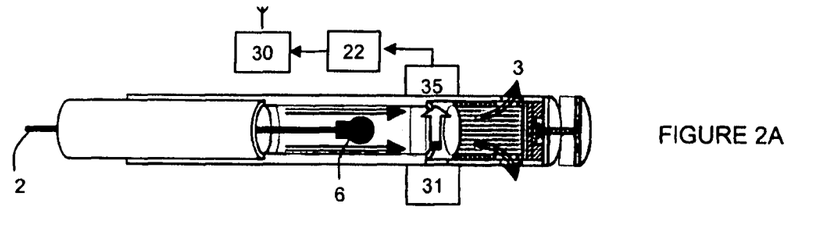
FIGS. 2A and 2B depict a device of the invention in use during cable arrival detection.
Figure 2B:
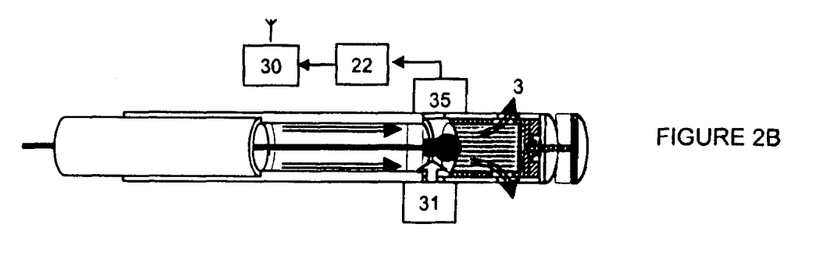

During this process, the air flow through the sensor housing may be slightly disturbed, particularly when the protection bead on the leading end of the fiber unit and the bead first emerges from the conduit as shown in FIGS. 2A and 2B. The magnetic arrangement however ensures that the piston is securely held in the activated position regardless of perturbations in air flow, which in turn ensures that the optical beam remains substantially undisturbed. At the point when the bead (and the fibre unit following the bead) travels past or through the light beam "X," the signal level received at the receiver changes by reducing substantially, perhaps to zero. This change is detected (22) and a corresponding status signal transmitted (30) to the operator at the head end.

Because of the relative size of the bead (6) and the fiber unit (2) to which the bead is attached, the level of interference or interruption to the light beam "X" may differ in practice, depending on the width of the light beam, sensitivity of the optical transmitter, and so on. Thus, the change in the light beam level or intensity may convey a simple "on/off" status. In the embodiment shown in e.g., FIG. 2, however, the bead will advance beyond the optical beam and embed itself in the closed end of the piston. In that state only the fiber unit lies in the path of the beam. Depending on the diameter of the fiber unit, the beam may or may not fully block the path of the beam to the receiver. To accommodate this eventuality, the receiver may be configured to detect a signal at an intermediate light level, set between a maximum (when the piston is at the activated position) and a minimum (when the bead interrupts the beam). Such a "partial" signal can be detected on its own, or else form part of a pattern comprising a relatively sudden and complete loss of signal followed by a partial return in signal level. This light pattern can be a robust indicia of fiber arrival especially where stray light is present in the housing (e.g. via the air vents, or from the join between the housing and the conduit end).

In any event, the change in the detected light level to a different state (being either a zero reading or a partial level reading), or a pattern as described above is picked up by the detector to create an unambiguous status signal (28) to the operator at the head end, who then knows that the fiber cable has arrived and that the installation is complete.

The air compressor and the blowing head can then be shut off, either manually by the operator, or in a further embodiment the receipt of the status signal could be linked to the blowing head so that the blowing head can be automatically switched off on receipt of the signal as further discussed below with reference to FIG. 5. At this point, the operator travels back to the remote site to remove the device from the conduit ending, and to reset it by pushing the button (42) so that the piston within the housing returns to its rest position for the device's next use.

As the skilled person would be aware, the components of the device can be used in various combinations and can be substituted by various other components. Some exemplary embodiments will now be discussed.

Figure 3A:
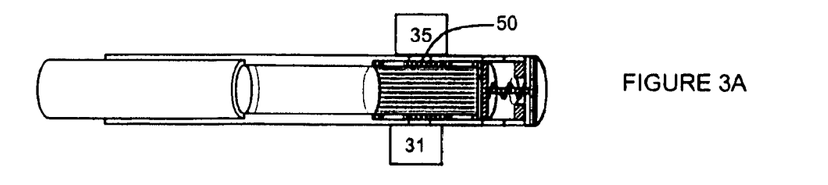
FIGS. 3A and 3B depict an alternative embodiment of the invention.
Figure 3B:
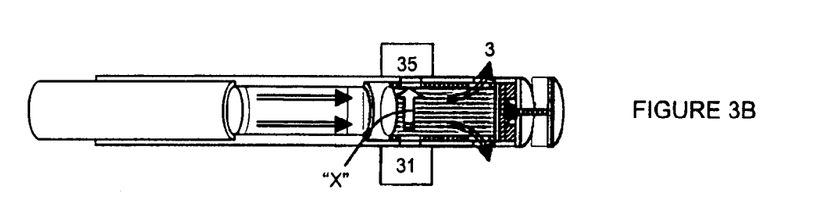
Figure 4A:
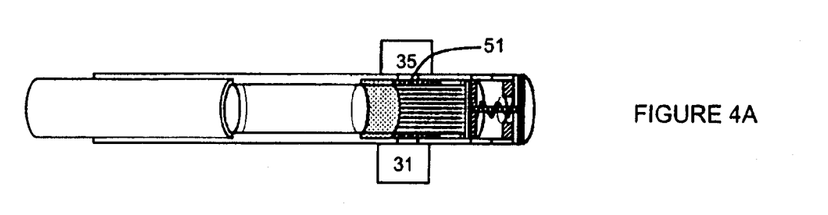
FIGS. 4A and 4B depict another alternative embodiment of the invention.
Figure 4B:
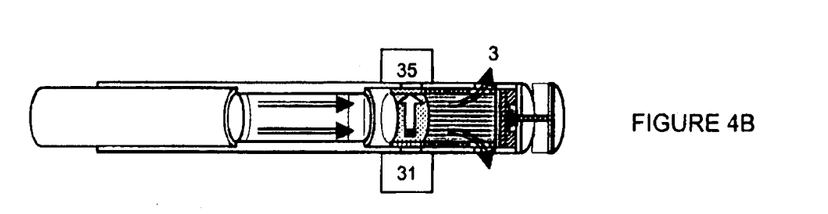

FIGS. 3 and 4 show embodiments in which parts of the piston are opaque and parts of it are transparent to light. The piston may include holes (50) which in the first rest position are out of alignment with the light beam path "X" as shown in FIG. 3A, and which in the second activated position shown in FIG. 3B are aligned with the light beam path "X" permitting light to reach the receiver (33). The same arrangement is shown respectively in FIGS. 4A and 4B where the holes in the piston are replaced by windows or a cylindrical region (51) which are optically pervious to the light beam "X" emanating from the transmitter (31). In these two exemplary embodiments, the piston may be configured to be longer to accommodate the holes or transparent sections. In practice, the addition length may be advantageous as such a piston might more smoothly slide or glide between positions. Better avoidance of or tolerance of grit or such debris accumulating between the piston and the housing may also be achieved.

The skilled person would also realize that it is within the scope of the invention to reverse the light beam receipt status in the resting and activated positions, so that light is received by the receiver during the rest position (which would allow a status signal to be sent back to the operator at the head end as an assurance that the sensor device is active and ready, before commencement of the operation), and the light beam interrupted upon arrival of the air and/or the fiber unit. This would require the appropriate placement of holes or optically transparent sections on the piston, relative to the intended path of the light beam.

Another possible variation would be that the optical transmitter and receiver need not be placed precisely transversely opposite to each along the housing. It is possible to place them in diagonal, or other, positions, as long as the piston upon air arrival is displaceable to permit a detectable optical receiver change, and for a further light beam change to be generated upon fiber arrival. The piston also need not simultaneously shield the optical transmitter and receiver, as long as the light beam emanating from the transmitter is not received by the receiver when this is not intended. Thus, it is possible for the device to be configured so that either the transmitter or the receiver is shielded when no light signal is to be detected. In a further embodiment, it is possible to configure the piston movement along the housing caused by air arrival to trigger a power switch of the transmitter so as to turn the light on or off for detection by the receiver and the detector. Alternatively, the power switch may be used to turn on the receiver, with the light transmitter always powered on during the installation session, or the power switch may be used to turn on both the transmitter and receiver. Turning on the transmitter and/or receiver only when needed may help to prolong battery life for the device as a whole. That policy could be extended to turn on/off all of the other active elements in the device, e.g., amplifier, processor, RF transmitter and so on.

The rod (44) and reset button (42) are optional to the operation of the device, and may not be needed in a disposable version of the device. The spring (40) can be replaced by any resilient component which urges the piston to the first resting position. In an embodiment, the pushing force of the spring against the piston can be pre-selected so that the piston is caused to travel only when air pressure within the housing reaches a pre-determined level. In one embodiment, this air pressure level should approximate that of the air pressure applied at the head end: by way of example, the applicants feed air compressed to 10 bar into the tube. This allows the operator to start the fiber installation process only when the desired air pressure level is attained within the conduit, as blown fiber may not propagate successfully through the tube if there is insufficient air flow therein.

As a further design consideration, the force of the spring in the activated position should be less than the magnetic force holding the piston in place. Furthermore, the coupling strength of the magnetic arrangement should be sufficiently robust to avoid the piston accidentally springing back to the resting position, yet allow for the device to be reset by an operator without too much difficulty after an installation.

Figure 5:
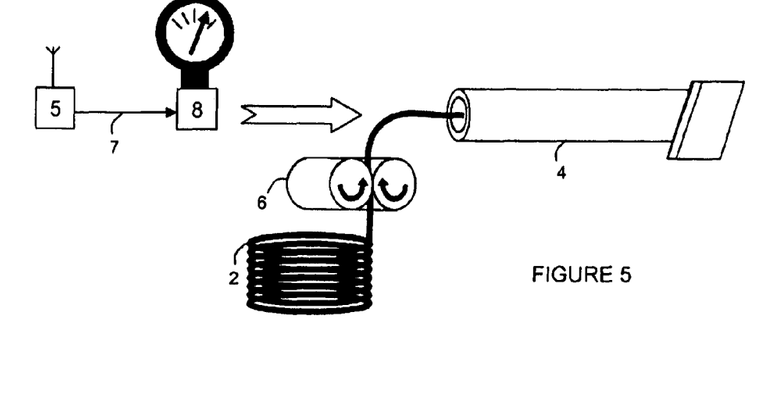
FIG. 5 depicts the main components of apparatus used in a blown fibre installation at the head end.

FIG. 5 depicts the main apparatus components located at the head end of the optical fiber conduit or tube, where the operator is located. There, he operates a blowing head which controls the forces propelling an optical fiber unit (2) into the conduit or tube (4), which forces comprise a pair of drive wheels (6) and a supply of pressurized air (8) typically from a compressor. The drive wheels mechanically drive the fiber unit into the tube, while the compressed air is fed into the conduit to create within it the laminar air flow will bear the fiber unit along and through the tube.

The blowing head may be capable of detecting that the fiber unit is no longer progressing through the tube, which could be a result of the fiber arriving at the remote end, or else it is otherwise caught or stuck within the tube. In response, the blowing head stops the drive wheels from further pushing the fiber unit into the tube. The receipt (or non-receipt) of confirmation that the fiber bead has arrived at the remote end via the radio receiver (5) allows the operator to decide what to do next: to end the successful installation, or else to take remedial action.

In an embodiment, the head end apparatus (in the main, the blowing head and the air compressor) is configured to respond (7) to the receipt of a signal indicative of fiber arrival at the remote end, by terminating the installation session, e.g. by turning themselves off, or going into a standby mode. There is a particular synergy in doing so in the case of the blowing head, due to this component's already-existing capability to sense lack of further progress of the fiber within the tube: receipt of the fiber arrival signal confirms the cause of the lack of fiber progress. Similarly, the apparatus at the head end could be configured to respond to the initial signal that air is flowing from the remote end conduit, by automatically starting the fiber installation process.

Figure 6:
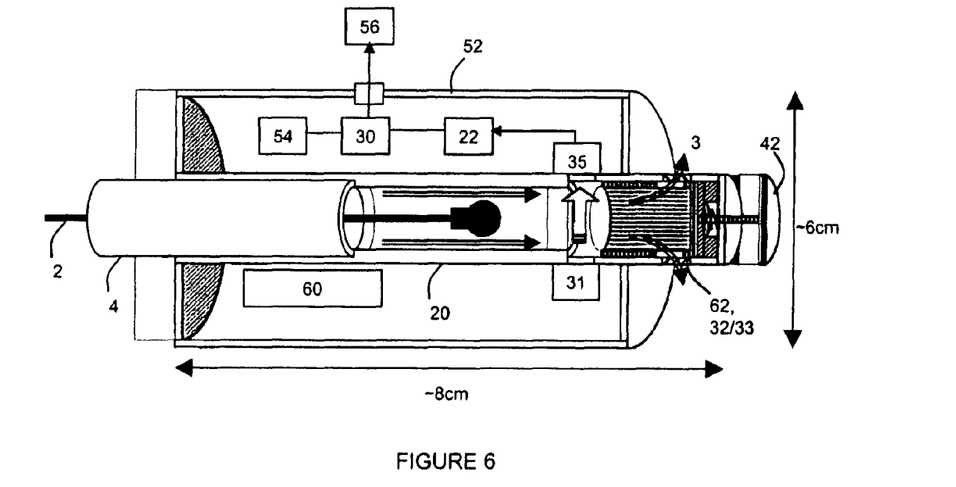
FIG. 6 depicts a device of the invention and its enclosure.
Figure 7:
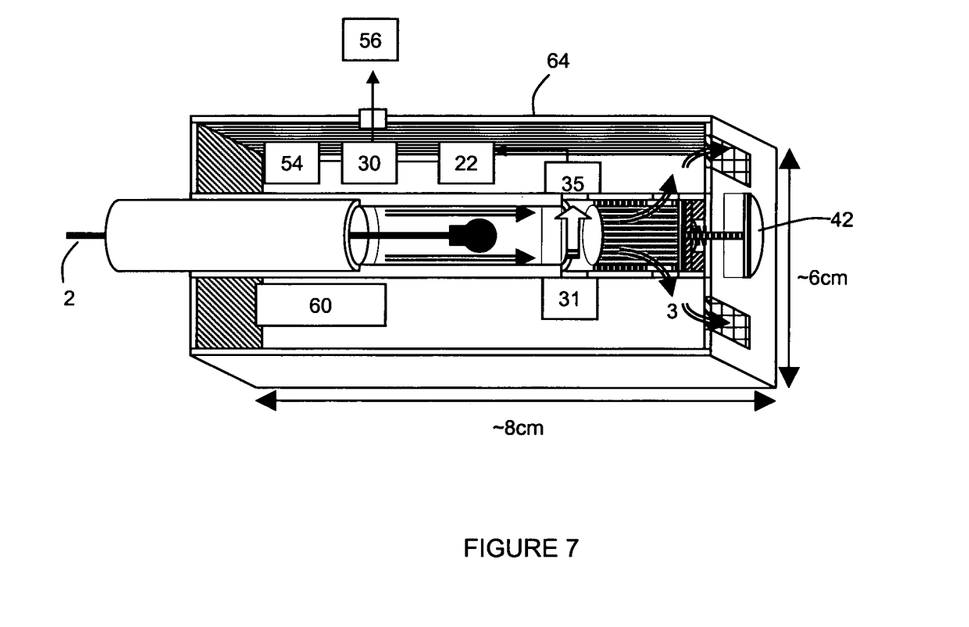
FIG. 7 depicts a device of the invention with an alternative enclosure.

FIGS. 6 and 7 depict two embodiments of the full enclosure surrounding the embodiment of the device discussed in FIGS. 1 and 2, which may be about 8 cm long and about 6 cm wide for use with a conduit having an external diameter of typically 3 mm in the case of small-bore conduits, up to 15 mm and more for large bore conduits. In an embodiment, the coupling flange fixed to the enclosure may be adjustable to tightly fit the conduit in use, or the coupling flange may be removable from the enclosure whereupon the correct sized flange for the conduit in use is selected from a range of fix sizes and then attached to the enclosure. In either case the flange ensures a mechanically robust and air tight coupling between the enclosure and the conduit.

In FIG. 6, the device comprises two injection-molded plastic sections: the inner tubular housing (20), and the outer enclosure (52). Fine gauze dust shields (62) are optionally provided on the air vent openings (32 and 33) to prevent or discourage contamination of the interior of the device; they are otherwise not required for the working of the invention. The outer enclosure is configured to avoid the air vents so enclosure. Once assembled, the only service-removable part is the battery cover protecting the dry cell battery (60) on the outer enclosure surface. Should it be found desirable to replace the dust shields, then they too could be made to be service-removable. A minimal number of service-removable parts is however advantageous for easy maintenance.

An internal antenna (54) used for transmitting RF signals about air and fiber arrival to the head end, may be incorporated within the enclosure, or alternatively an external antenna (56) could be used for greater range/gain in operational situations where radio reception may be impaired (e.g. down a manhole). Ideally, the fiber conduit at the remote end is long enough to extend the fiber conduit route to ground/surface level for the purposes of the installation process, in which case radio reception is improved and a reliable channel may be established with the head end operator.

Should there be insufficient length of conduit, a bridging length of dummy conduit can be temporarily attached for purposes of the installation.

FIG. 7 shows an alternative outer enclosure (64) consisting a simple injection-molded box. In this implementation, only the reset button (42) stands proud of the outer enclosure. All the other elements of the device can be enclosed, even the air vent openings (34 and 36), although the gauze dust shields (62) must be configured to allow for sufficient airflow through the conduit and out of the device for purposes of the blown fiber installation session.

The methods, devices, components and configurations described above and in the drawings are for ease of description only and not meant to restrict the invention to any particular embodiments. It will be apparent to the skilled person that various sequences and permutations on the methods and devices described are possible within the scope of this invention as disclosed; similarly the invention could be used in various similar scenarios and for various cable and conduit types and sizes. In particular, the apparatus and methods relating to airflow detection and the methods and apparatus relating to fiber arrival detection are depicted in this description to be used together in one embodiment. However, they will work independently of each other on their own.

The invention claimed is:

1. A device for use with a conduit having a first conduit end and a conduit second end, into which conduit a cable can be installed using a flow of air into the first conduit end, the device being suitable for confirming that the flow of air is exiting the second conduit end, the device comprising:
   a housing;
   means to enable connection of the device to the second conduit end;
   a light source;
   a detector arranged to detect a presence or an absence of a light signal; and
   a light shield,
   wherein in use, the flow of air entering the device causes the light shield to move to and stay at a second position relative to at least one of the light source or the detector, permitting the detector to detect at least one detection comprising one or more of:
      a presence or an absence of the light signal,
      an intensity level of the light signal,
      a change in the presence or the absence of the light signal, or
      a change in an intensity level of the light signal.

2. A device according to claim 1, wherein the detector comprises an optical receiver connected to a signal processor, the device further comprising a transmitter for transmitting a status signal comprising at least one detection.

3. A device according to claim 1, wherein the light shield is arranged to move within the housing.

4. A device according to claim 1, further comprising holding means to hold the light shield in one of either a first position or a second position, wherein movement between the first position and the second position causes a change in the presence or the absence of the light signal or a change in the intensity level of the light signal.

5. A device according to claim 4, wherein the holding means to hold the light shield in the first position comprises a spring urging against the light shield.

6. A device according to claim 5, wherein the holding means to hold the light shield in the second position comprises means causing compression of the spring.

7. A device according to claim 6, wherein the holding means comprises a magnet and a metal disc disposed opposite to each other.

8. A device according to claim 7, wherein in use, the flow of air entering the device causes the magnet and the metal disc to move towards each other and then to be magnetically coupled together.

9. A device according to claim 4, further comprising an air vent through which in use, the flow of air exits from the housing when the light shield is in the second position.

10. A device according to claim 4, further comprising means to return the light shield to the first position from the second position.

11. A device according to claim 4, wherein the light shield prevents the detector from detecting the light signal when the light shield is in the first position.

12. A device according to claim 1, wherein the light shield includes a transparent section.

13. A device according to claim 1 for confirming that the cable is exiting the second conduit end, further comprising:
   a housing;
   means to enable connection of the device to the second conduit end;
   a light source; and
   a detector arranged to detect a change in a light signal,
   wherein in use, the cable entering the housing of the device interferes with detection by the detector of a light signal from the light source.

14. A device according to claim 13, wherein a bead is connected to the cable, and the detector is arranged to detect interference of the light signal by the bead.

15. A device according to claim 1, wherein the device is configured to confirm that the cable has exited the second conduit end, and wherein the detector is further arranged to detect a subsequent interference of the light signal from the light source.

16. A system for use with a conduit having a first conduit end and a conduit second end, into which conduit a cable can be installed using a flow of air into the first conduit end, for confirming that the flow of air is exiting the second conduit end, comprising:
   a device comprising
      a housing,
      means to enable connection of the device to the second conduit end,
      a light source,
      a detector arranged to detect a presence or an absence of a light signal and comprising an optical receiver connected to a signal processor,
      a transmitter for transmitting a status signal comprising at least one detection, and
      a light shield,
      wherein in use, the flow of air entering the device causes the light shield to move to and stay at a second position relative to at least one of the light source or the detector, permitting the detector to detect at least one detection comprising one or more of:
         a presence or an absence of the light signal,
         an intensity level of the light signal,
         a change in the presence or the absence of the light signal, or
         a change in an intensity level of the light signal; and
   an apparatus at the first conduit end configured to receive and to automatically respond to the transmitted status signal.

17. A system according to claim 16, further arranged for installing a cable using a flow of air into the first conduit end, comprising:
   a device for confirming that the cable is exiting the second conduit end comprising
      a housing,
      means to enable connection of the device to the second conduit end,
      a light source, and a detector arranged to detect a change in a light signal and including a transmitter for transmitting a status signal comprising the detection, wherein in use, the cable entering the housing of the device interferes with detection by the detector of a light signal from the light source; and an apparatus at the first conduit end configured to receive and to automatically respond to the transmitted status signal.

18. A system for use with a conduit having a first conduit end and a conduit second end, into which conduit a cable can be installed using a flow of air into the first conduit end, for confirming that the flow of air and the cable are exiting the second conduit end, comprising:

a device configured to confirm that the cable has exited the second conduit end, comprising
a housing,
means to enable connection of the device to the second conduit end,
a light source,
a detector arranged to detect a presence or an absence of a light signal and to detect a subsequent interference of the light signal from the light source, the detector including a transmitter for transmitting at least two status signals comprising at least two detections, and
a light shield,
wherein in use, the flow of air entering the device causes the light shield to move to and stay at a second position relative to at least one of the light source or the detector, permitting the detector to detect at least one detection comprising one or more of:
a presence or an absence of the light signal,
an intensity level of the light signal,
a change in the presence or the absence of the light signal, or
a change in the an intensity level of the light signal; and
an apparatus at the first conduit end configured to receive and to automatically respond to the transmitted status signals.

19. A method for use with a conduit having a first conduit end and a conduit second end, into which conduit a cable can be installed using a flow of air into the first conduit end, and to confirm that the flow of air is exiting the second conduit end, the method comprising: attaching a device to the second conduit end, the device comprising a housing, a light source, a detector arranged to detect a presence or an absence of a light signal, and a light shield: applying the flow of air into the first conduit end, causing the light shield of the device to move to and stay at a second position relative to at least one of the light source or the detector of the device; and detecting detections comprising one or more of a presence or an absence of the light signal, an intensity level of the light signal, a change in the presence or the absence of the light signal, or a change in the intensity level of the light signal.

20. A method for use with a conduit having a first conduit end and conduit second end, into which conduit a cable can be installed using a flow of air into the first conduit end, and to confirm that the flow of air and the cable are exiting the second conduit end, the method comprising; attaching a device to the second conduit end, the device configured to confirm that the cable has exited the second conduit end and comprising a housing, means to enable connection of the device to the second conduit end, a light source, a detector arranged to detect a presence or an absence of a light signal and to detect a subsequent interference of the light signal from the light source, and a light shield; applying the flow of air into the first conduit end, causing the light shield of the device to move to and stay at a second position relative to at least one of the light source or the detector of the device; detecting detections comprising one or more of a presence or absence of the light signal, an intensity level of the light signal, a change in the presence or absence of the light signal, or a change in the intensity level of the light signal; and detecting a subsequent interference of the light signal.

21. A method for use with a conduit having a first conduit end and a conduit second end, into which conduit a cable can be installed using a flow of air into the first conduit end, and to confirm that the flow of air and the cable are exiting the second conduit end, the method comprising:

attaching a device to the second conduit end, the device configured to confirm that the cable has exited the second conduit end and comprising a housing, means to enable connection of the device to the second conduit end, a light source, a detector arranged to detect a presence or an absence of a light signal and to detect a subsequent interference of the light signal from the light source, and a light shield;

applying the flow of air into the first conduit end, causing the light shield of the device to move and to be retained relative to at least one of the light source or the detector of the device;

detecting detections comprising one or more of a presence or absence of the light signal, an intensity level of the light signal, a change in the presence or absence of the light signal, or a change in the intensity level of the light signal; and detecting a subsequent interference of the light signal.

22. A method according to claim 21, further comprising:
transmitting one or more status signals each comprising one or more detections or interferences to an apparatus located at the first conduit end; and
causing the apparatus at the first conduit end to automatically respond to the transmitted status signal.

23. A method according to claim 22, further comprising:
transmitting one or more status signals each comprising one or more detections or interferences to an apparatus located at the first conduit end; and
causing the apparatus at the first conduit end to automatically respond to the transmitted status signal.

24. A method according to claim 17, wherein a bead is connected to the cable, and the detector is arranged to detect interference of the light signal by the bead.

25. A method according to claim 20, wherein a bead is connected to the cable, and the detector is arranged to detect interference of the light signal by the bead.

* * * * *